(12) United States Patent
Sun

(10) Patent No.: US 9,044,854 B2
(45) Date of Patent: Jun. 2, 2015

(54) OPERATING TABLE WITH MULTIPLE DEGREES OF FREEDOM

(75) Inventor: Zhubin Sun, Zhejiang (CN)

(73) Assignee: ZHEJIANG LINIX MOTOR CO., LTD., Hengdian Electronic Industry Zone, Dongyang, Zhejiang (CN)

( * ) Notice: Subject to any disclaimer, the term of this patent is extended or adjusted under 35 U.S.C. 154(b) by 229 days.

(21) Appl. No.: 13/879,389

(22) PCT Filed: May 18, 2012

(86) PCT No.: PCT/CN2012/075686
§ 371 (c)(1),
(2), (4) Date: Apr. 12, 2013

(87) PCT Pub. No.: WO2012/167688
PCT Pub. Date: Dec. 13, 2012

(65) Prior Publication Data
US 2013/0200561 A1    Aug. 8, 2013

(30) Foreign Application Priority Data
Jun. 9, 2011   (CN) .......................... 2011 1 0153930

(51) Int. Cl.
| | |
|---|---|
| B25H 1/00 | (2006.01) |
| B25H 1/02 | (2006.01) |
| B25H 1/14 | (2006.01) |
| B23Q 1/25 | (2006.01) |
| B23Q 1/48 | (2006.01) |
| B23Q 1/62 | (2006.01) |

(52) U.S. Cl.
CPC .. *B25H 1/02* (2013.01); *B25H 1/14* (2013.01); *B23Q 1/25* (2013.01); *B23Q 1/4857* (2013.01); *B23Q 1/626* (2013.01)

(58) Field of Classification Search
CPC .............. B23Q 1/25; B25H 1/02; B25H 1/14; B25H 1/16
USPC ..................... 269/55, 59, 60, 71, 75
See application file for complete search history.

(56) References Cited

U.S. PATENT DOCUMENTS

| | | | | | |
|---|---|---|---|---|---|
| 2,763,053 | A | * | 9/1956 | Anderson | 269/59 |
| 2,814,099 | A | * | 11/1957 | Knittel | 269/17 |
| 3,124,018 | A | * | 3/1964 | Gough | 269/60 |
| 3,241,243 | A | * | 3/1966 | Speer | 33/503 |
| 3,495,519 | A | * | 2/1970 | Bluitt et al. | 108/137 |
| 4,317,560 | A | * | 3/1982 | Troyer | 266/48 |
| 4,505,464 | A | * | 3/1985 | Chitayat | 269/73 |

(Continued)

*Primary Examiner* — Lee D Wilson
*Assistant Examiner* — Tyrone V Hall, Jr.
(74) *Attorney, Agent, or Firm* — Tianhua Gu; Global IP Services

(57) ABSTRACT

Disclosed is an operating table with multiple degrees of freedom which is capable of moving and rotating in various directions. The operating table comprises an elevating mechanism, a moving mechanism on a horizontal plane and a multiple angle rotation mechanism, with the elevating mechanism and the moving mechanism adopting a leadscrew structure, the multiple angle rotation mechanism comprising a universal joint device (7) and a locking mechanism. The moving mechanism can drive the operating table (6) to move on a horizontal plane and ensure the operating table (6) can reach any location within a valid region on a horizontal plane, the moving mechanisms in the X and Y directions can operate separately as well as cooperatively, and the multiple angle rotation mechanism drives the surface of the operating table to tilt. These mechanisms work in combination to accomplish the location change of the operating table.

10 Claims, 6 Drawing Sheets

(56) References Cited

U.S. PATENT DOCUMENTS

| | | | |
|---|---|---|---|
| 4,896,869 A * | 1/1990 | Takekoshi | 269/60 |
| 5,863,034 A * | 1/1999 | Vauter | 269/51 |
| 7,637,487 B2 * | 12/2009 | Muto | 269/55 |

* cited by examiner

OPERATING TABLE WITH MULTIPLE DEGREES OF FREEDOM

CROSS REFERENCE TO RELATED PATENT APPLICATION

The present application is the US national stage of PCT/CN2012/075686 filed on May 18, 2012, which claims the priority of the Chinese patent application No. 201110153930.7 filed on Jun. 9, 2011.

TECHNICAL FIELD OF THE INVENTION

The invention relates to an operating table structure, and in particular to an operating table with multiple degrees of freedom, which is capable of moving and rotating in various directions.

BACKGROUND OF THE INVENTION

Operating tables, even some specialized operating tables, have to be configured for general machining operations. A good and suitable operating table plays a very important role in promoting the operation, thus improving the machining efficiency and improving the operation precision and stability, and also reducing the labor load of the operators. Operating tables relatively satisfy the ergonomics.

The existing operating tables generally are of fixed structures, and the locations of the operating tables are unchangeable. The whole pedestal of an operating table needs to be moved to change the location of the operating table, and the location of the operating table is changed by changing the location of the pedestal. However, as the pedestal of the operating table is heavy and is inconvenient to move, an empty location is required for placing the operating table again once the operating table is moved, and there should be no other objects in the empty location; meanwhile, there must be a passage for moving from the original location to the new location, as a result, a larger space is required. As the existing whole operating table is placed in an operating room and fixedly located, the movement of the operating table is restricted by the space around.

With the development of technology and the improvement of living standards, requirements to operating tables are increasing, and devices to be machined or operated on the operating tables are more and more complex. When in use, an operating table may have its upper surface adjusted in angle in addition to location movement. The surface of the operating table is tilted to drive the devices or clamps to tilt to meet the need of machining. Sometimes, the angle of the surface of the operating table also needs to be adjusted in order to expand the viewing angle or enhance the light.

The Patent Office of China published a patent No. CN2508909Y on Sep. 4, 2002, titled UNIVERSAL OPERATING TABLE. This operating table comprises a reference table surface which is provided with a clamp and an upright column for supporting the table surface. A universal clamping device is arranged between the reference table surface and the upright column, and the universal clamping device mainly consists of a cylinder body, a piston inside the cylinder body, a ball outside the piston inside the cylinder body, and a flange cover. The piston and the ball are fitted for clamping, and the ball enables the reference table surface to rotate freely. However, this structure cannot move in the horizontal direction.

The Patent Office of China published a patent No. CN101326588B on Nov. 17, 2010, titled XY OPERATING TABLE ACTUATOR. A driving mechanism, which enables the objects carried on the operating table to move and locate freely in an XY plane, can be built in the actuator. The actuator can accomplish significant miniaturization, and can suppress the height of the operating table to be lower. The actuator consists of a fixed plate, a moving plate, an intermediate plate, an X driving mechanism and a Y driving mechanism. The fixed plate has an accommodating groove in the X direction. The moving plate has an accommodating groove in the Y direction. The lower half part of the intermediate plate is assembled in the accommodating groove of the fixed plate by a rolling element, and the upper half part of the intermediate plate is assembled in the accommodating groove of the moving plate by a rolling element. The intermediate plate can freely move towards the X direction with respect to the fixed plate, and towards the Y direction with respect to the moving plate. The X driving mechanism pushes the intermediate plate towards the X direction with respect to the fixed plate. The Y driving mechanism pushes the moving plate towards the Y direction with respect to the intermediate plate. Accommodating chambers of both the X driving mechanism and the Y driving mechanism are arranged on the intermediate plate, respectively. The operating table ca move, but cannot rotate. Moreover, the movement of the adopted structure is relatively complex.

SUMMARY OF THE INVENTION

The invention solves the disadvantages that the operating tables in the prior art are of fixed structures and cannot move, and provides an operating table with multiple degrees of freedom, so that the operating table ca move in various directions in the horizontal plane.

The invention also solves the disadvantages that the operating tables in the prior art are of fixed structures, and cannot rotate, and provides an operating table with multiple degrees of freedom, so that the upper surface of the operating table can be tilted freely to accomplish angle adjustment.

The purpose of the invention is to provide an operating table with multiple degrees of freedom, which has simple structure and is capable of accomplishing multi-directional movement and multi-angle adjustment.

The following technical solution is employed in the invention to solve the technical problems thereof. An operating table with multiple degrees of freedom comprises a pedestal, a moving device arranged on the pedestal, and an operating table connected with the moving device. The moving device comprises an elevating mechanism, a moving mechanism on a horizontal plane and a multiple angle rotation mechanism. The elevating mechanism and the moving mechanism are of a leadscrew moving structure. The elevating mechanism comprises a leadscrew and a rotary sleeve connected with the leadscrew. The moving mechanism consists of a moving mechanism in the X direction and a moving mechanism in the Y direction, the moving mechanism in the X direction and the moving mechanism in the Y direction comprise one leadscrew and a leadscrew nut connected with this leadscrew, respectively, and, the moving mechanism in the X direction and the moving mechanism in the Y direction are mutually overlapped vertically and fixed with the top end of the leadscrew of the elevating mechanism. The multiple angle rotation mechanism comprises a universal joint device and a locking mechanism. The moving device may be operated manually or automatically, or controlled separately or cooperatively, or controlled digitally via programming. The elevating mechanism drives the operating table to move up and down, so as to adjust the height of the operating table. The moving mechanism mainly moves in the horizontal plane, the moving mechanism in the X direction moves back and forth in the X-axis direction, the moving mechanism in the Y direction moves back and forth in the Y-axis direction, movements of the moving mechanism in the X direction and the moving mechanism in the Y direction in the two directions may be independently driven to complete linear movement separately and may also be driven cooperatively to complete diagonal or arc-shaped movement, and the movement speeds thereof may be same or different. The moving mechanism in the X direction and the moving mechanism in the Y direction are vertically overlapped, so that the moving mechanism in the X direction and the moving mechanism in the Y direction are separated from each other without mutual interference. As a result, a larger space may be left for assembly and maintenance; in addition, the moving mechanism may be further upgraded or updated, for example, in order to improve the efficiency or to adjust the precision, the manual control may be upgraded to automatic control and control systems for electric, liquid or gas may be added, in this case, the space left may be used for placing and assembling these parts required for upgrading; and a larger space may be provided for refitting the moving mechanism in the X direction or the moving mechanism in the Y direction, so that they can complete relatively complex movements. The accomplishment of the elevating mechanism and the moving mechanism is accomplished in combination of the leadscrew and the leadscrew nut, the leadscrew nut is fixed, the leadscrew nut moves around the axis of the leadscrew when the leadscrew rotates, and if the leadscrew does not rotate, the leadscrew moves around the axis when the leadscrew nut rotates. The multiple angle rotation mechanism controls the operating table to rotate around a center point. The universal joint device may be of a universal joint structure, or a universal ball structure, or a combination of two vertical hinges. The operating table is locked via the locking mechanism when rotating to a set tilt angle, and then the operating table is fixed in the set angle. The leadscrew and the leadscrew nut may form an automatic locking structure.

Preferably, the pedestal is of a frame structure, and has a supporting plate on which the elevating mechanism is arranged. The moving device also comprises a guide post which is parallel to the leadscrew of the elevating mechanism, and the guide post is inserted into a guide hole on the supporting plate. The supporting plate is mainly used for supporting and fixing the moving device, the guide post is fitted with the elevating mechanism, when the leadscrew of the elevating mechanism moves up and down, the guide post can play a role of guiding, so as to prevent the deflecting force generated by the elevating motion from acting on the leadscrew to influence the service life of the leadscrew, and meanwhile, the guide post is also a protective measure and can play a role of protection when accidents occur, so that the moving device and the operating table cannot fall down from the top, the safety is guaranteed.

Preferably, a gear is arranged inside the rotary sleeve, a threaded hole is arranged in a center part of the gear, and the leadscrew of the elevating mechanism penetrates into the threaded hole to fit therewith. An adjusting screw rod with an adjusting handle is arranged on a side of the rotary sleeve, the adjusting screw rod is engaged with gear teeth of the gear, and the rotary sleeve is fixed on the lower surface of the supporting plate on the pedestal. The leadscrew penetrates into the rotary sleeve, the gear in the rotary sleeve can rotate freely, the gear has internal threads to form a nut structure which is equivalent to the leadscrew nut fitted with the leadscrew, gear teeth are provided outside the gear, and the gear teeth are fitted with the adjusting screw rod to form a turbine and worm structure. The adjusting screw rod rotates under the driving of the adjusting handle, so as to drive the gear to rotate. The rotary sleeve is fixed, and no relative movement will be produced between the gear and the rotary sleeve, so the leadscrew moves up and down around the axis when the gear rotates.

Preferably, the moving mechanism in the Y direction comprises a fixed plate fixed with the leadscrew of the elevating mechanism and a moving plate in the Y direction connected with the fixed plate through a guide rail, the leadscrew of the moving mechanism in the Y direction is fixed on the fixed plate, and the leadscrew nut of the moving mechanism in the Y direction is fixed to the lower surface of the moving plate in the Y direction. The moving mechanism in the X direction comprises a moving plate in the X direction, the leadscrew of the moving mechanism in the X direction is fixed to the upper surface of the moving plate in the Y direction, and the leadscrew nut of the moving mechanism in the X direction is fixed to the lower surface of the moving plate in the X direction. The two leadscrews are mutually vertical, and the moving plate in the X direction and the moving plate in the Y direction are connected via the guide rail. The fixed plate only moves up and down, without producing transverse horizontal movements. The fixed plate is a bottom supporting part; the weight pressure generated by the operating table is delivered to the leadscrew and the guide post via the fixed plate. The moving plate in the Y direction moves back and forth in the Y direction above the fixed plate, the moving mechanism in the X direction moves synchronously when the moving plate in the Y direction moves, and the moving plate in the X direction moves back and forth in the X direction to play a role of guiding to avoid deflecting in the moving process to cause clamping.

Preferably, the guide rail comprises a guide rod and a guide base fitted with the guide rod, the guide rod penetrates through the guide base, two ends of the guide rod are fixed via a supporting base, the supporting base is fixed at the bottom, the guide rod is fixed on the top, and the guide rail of the moving mechanism in the X direction and the guide rail of the moving mechanism in the Y direction are parallel to the respective corresponding leadscrews. The guide rod may move in the guide base to play a role of guiding, and meanwhile, may also limit the distance between the moving plate in the Y direction and the fixed plate and the distance between the moving plate in the X direction and the moving plate in the Y direction. Or, a concave guide rail and a convex guide rail which are mutually fitted can be adopted to play a role of supporting. Rollers may be arranged on opposite surfaces of the concave guide rail and the convex guide rail to reduce the moving resistance.

Preferably, the universal joint device comprises a ball and a ball seat receiving the ball. A spherical cavity fitted with the ball is arranged in the ball seat, the receiving area of the spherical cavity is greater than 50% of the surface area of the ball, and the ball is embedded into the ball seat. An inverted round table is fixed on the lower surface of the operating table, and the ball is fixed on the inverted round table. This is one solution where the fitting of the ball and the ball seat may accomplish universal rotation; an opening plane of the spherical cavity is horizontal, and the spherical cavity receives more than 50% of the surface area of the ball, so the ball will not fall from the spherical cavity when rotating in the spherical cavity; the ball is connected with the inverted round table via the operating table, in this way, first, the supporting area of the operating table may be increased and the stress distribution of the operating table may be optimized, and second, the distance between the ball and the lower surface of the operating table may be expanded, thus preventing the operating table producing collision or interference when the ball rotates and ensuring that the rotation angle of the ball meets the set requirements.

Preferably, the locking mechanism comprises two locking rods with external threads, the end of the locking rod is connected with a V-shaped clamping fork, and an opposite surface of the locking fork is provided with an arc-shaped concave surface fitted with the ball. A rod hole with internal threads is arranged on the ball seat, and the rod hole penetrates through the center of the spherical cavity. The inner surface of the ball seat is provided with a concave cavity fitted with the shape of the clamping fork, the concave cavity is communicated with the rod hole, the clamping rod penetrates into the rod hole, the clamping fork is hidden in the concave cavity, and the tail end of the locking rod extends out of the ball seat and is screwed with a locking nut on the exposed end. The ball is embedded into the spherical cavity, and the locking rod rotates to move around the axis of the rod hole. The V-shaped opening of the clamping fork gradually clamps the ball, and the locking nut locks the locking rod to prevent the locking rod from moving backward to cause relaxation. A contact surface between the clamping fork and the ball is an arc-shaped concave surface, which has a large stressed area and will not influence the ball. The axis of the locking rod penetrates through the center point of the spherical cavity, and the force from the clamping fork onto the ball penetrates through the center of the ball, and the ball will not deflect. The two locking rods may be mounted with an interval of 180 degrees or an interval of 90 degrees.

Preferably, the universal joint device comprises a universal joint, the universal joint comprises a cross shaft in the middle and two U-shaped forks which are vertically arranged, and the U-shaped forks are oppositely placed. One of the U-shaped forks is fixed with the center part of the operating table, while the other one is fixed with the moving mechanism in the X direction or the moving mechanism in the Y direction. This is another solution where the two U-shaped forks are mutually vertical, and the movement combination of the two U-shaped forks accomplishes the universal rotation of the operating table.

Preferably, the two vertical shaft ends of the cross shaft extend out of the U-shaped forks, the corresponding connection part between the U-shaped forks and the two shaft ends is a tapered hole, the extended shaft end is sleeved with a tapered locking sleeve fitted with the tapered hole, and the tapered locking sleeve is fixed by a locking nut. The tapered hole and a locking cap are fitted to lock the U-shaped forks, so as to lock the operating table.

Preferably, the elevating mechanism, the moving mechanism and the multiple angle rotation mechanism are connected with an automatic driving device, respectively, and the automatic driving device is a servo motor or a hydraulic mechanism. The adjusting screw rod on a side of the rotary sleeve of the elevating mechanism is connected with the servo motor, and the leadscrew of the moving mechanism is connected with the servo motor. The hydraulic mechanism comprises hydraulic cylinders and a hydraulic system, and there are total two hydraulic cylinders which are hinged to the lower surface of the operating table with an interval of 90 degrees with respect to the multiple angle rotation mechanism. The connection line between an upper hinge point of the hydraulic cylinder and the rotation center of the operating table is parallel to the operating table. The servo motor drives the leadscrew and controls the rotation angle of the leadscrew, so as to control the moving distance of the moving plate in the Y direction and the moving plate in the X direction. Scales may be set on the fixed plate and the moving plate in the Y direction, to be convenient for the precise locating of the operating table. The two hydraulic cylinders are used for operating the rotation angle of the operating table, the location of the hinge point of the hydraulic cylinder can ensure that the other hydraulic cylinder will not cause interference when one of the hydraulic cylinders drives the operating table to rotate.

The invention has the following advantages: the moving mechanism can drive the operating table to move on a horizontal plane and ensure the operating table can reach any location within a valid region on a horizontal plane; the moving mechanism in the X direction and the moving mechanism in the Y direction can operate separately or cooperatively, the vertical overlapping of the two moving mechanisms ensures that the moving directions thereof will not interfere with each other; in addition, the distribution space is increased to make the distribution more convenient; the elevating mechanism drives the operating table to elevate up and down, the multiple angle rotation mechanism drives the surface of the operating table to tilt. These mechanisms work in combination to accomplish the location change of the operating table.

DETAILED DESCRIPTION OF THE INVENTION

The technical solution of the invention will be further described in details below with reference to embodiments and drawings.

Embodiment 1

Figure 1:
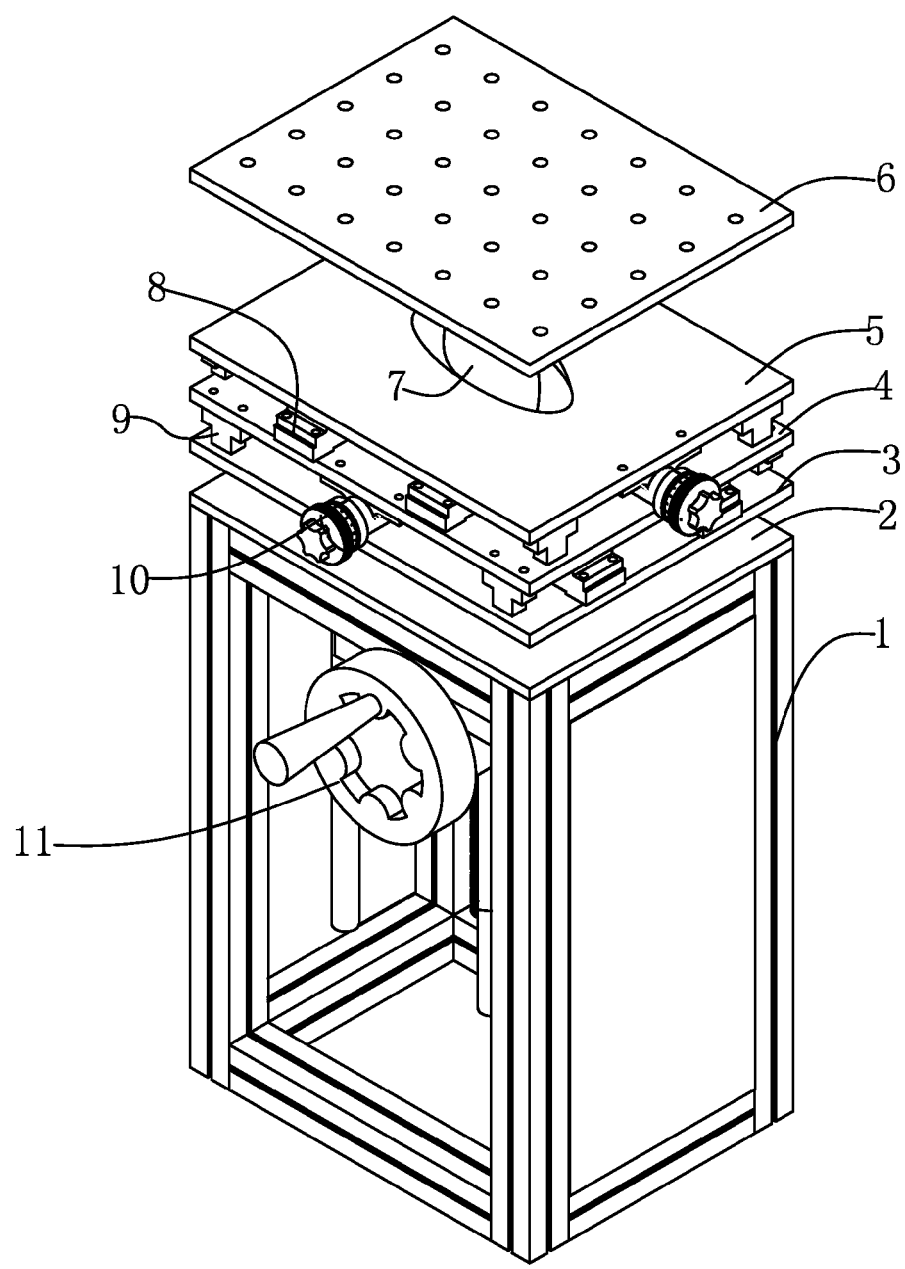
FIG. 1 is a structural diagram of the invention.
Figure 2:
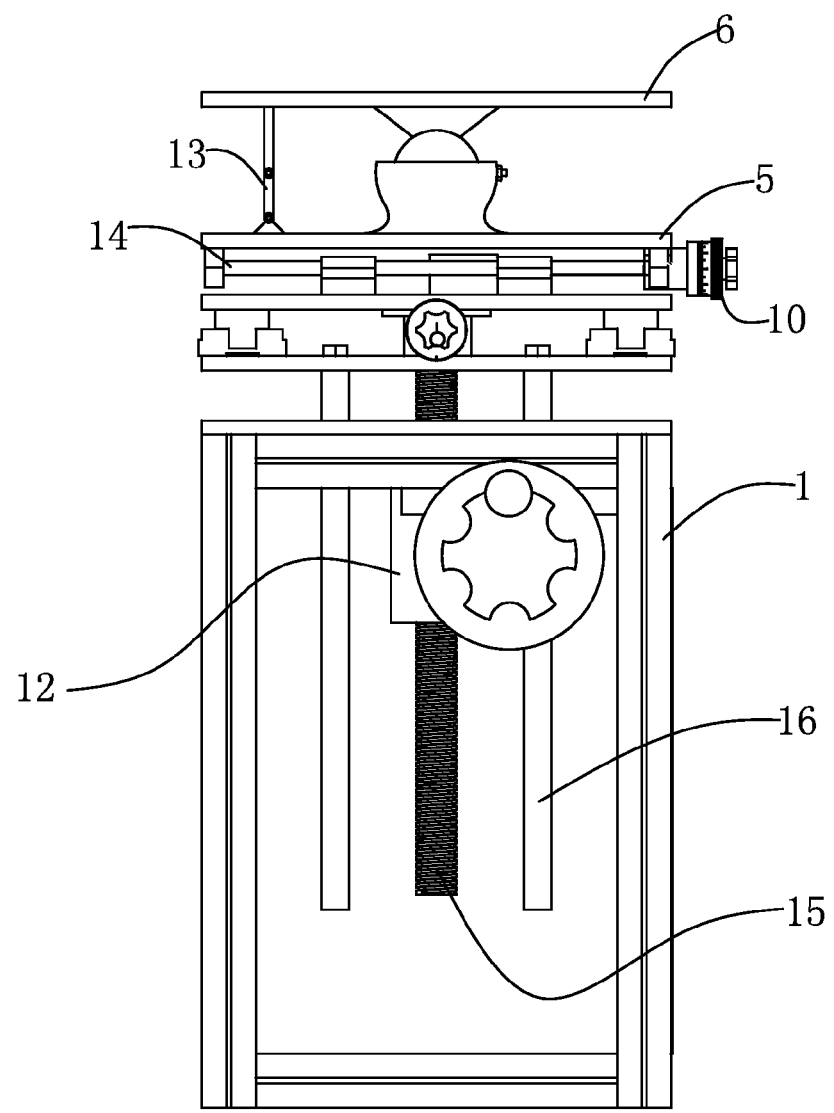
FIG. 2 is a side view of the structure of FIG. 1 of the invention.

An operating table with multiple degrees of freedom (referring to FIG. 1 and FIG. 2) comprises a pedestal 1 which is of a frame structure, a moving device arranged on the pedestal, and an operating table 6 connected with the moving device. Multiple locating holes are arranged on the operating table. The pedestal is formed of multiple square steels via splicing, the upper surface of the pedestal is a supporting plate 2, the supporting plate is provided with a threaded hole and two light holes which are symmetrical with respect to the threaded hole. The moving device comprises an elevating mechanism, a moving mechanism on a horizontal plane and a multiple angle rotation mechanism. The elevating mechanism comprises a leadscrew 15 arranged vertically to the supporting plate and a rotary sleeve 12 connected with the leadscrew, the leadscrew penetrates through the rotary sleeve, a gear with gear teeth is arranged in the rotary sleeve, a threaded hole is arranged in the center part of the gear, and the leadscrew penetrates into the threaded hole to fit therewith. An adjusting screw rod is arranged on a side of the rotary sleeve, the end part of the adjusting screw rod is provided with an adjusting handle 11, the adjusting screw rod and the gear teeth of the gear are engaged to form a turbine and worm structure, and the adjusting screw rod is vertical to the leadscrew. A guide post 16 penetrates in the light hole of the supporting plate, and the guide post is parallel to the leadscrew.

The moving mechanism comprises a moving mechanism in the X direction and a moving mechanism in the Y direction. The moving mechanism in the Y direction comprises a fixed plate 3, a moving plate in the Y direction 4, and a leadscrew and a leadscrew nut for connecting the fixed plate and the moving plate in the Y direction. The fixed plate is vertically fixed with the leadscrew of the elevating mechanism. The leadscrew of the moving mechanism in the Y direction is distributed in the Y direction, and two ends of the leadscrew are fixed to the middle parts of the two side edges of the fixed plate via bearings. Two sides of the fixed plate, which are parallel to the leadscrew, are fixed with the guide bases 8, and punching holes parallel to the leadscrew are arranged on the guide bases. A leadscrew nut is fixed in the middle part of the lower surface of the moving plate in the Y direction, and the leadsrew nut is fitted with the leadscrew. Two sides of the lower surface of the moving plate in the Y direction are provided with the guide rods 14, the two ends of the guide rods are fixed to the lower surface of the moving plate in the Y direction via supporting bases 9, and the guide rods penetrate through the punching holes of the guide bases. An adjusting hand wheel 10 with scales is fixed on the end part of the leadscrew.

The moving mechanism in the X direction comprises a moving plate in the X direction 5. A leadscrew in the X direction is fixed on the upper surface of the moving plate in the Y direction. Two ends of the leadscrew are fixed via a bearing, and one of the two ends is fixed with an adjusting hand wheel with scales. A leadscrew nut is fixed on the corresponding location of the lower surface of the moving plate in the X direction, and the leadscrew nut is fitted with the leadscrew in the X direction. The two X directional sides of the upper surface of the moving plate in the Y direction are fixed with the guide bases 8, and punching holes are arranged on the guide bases. The guide rods are fixed to the corresponding location of the lower surface of the moving plate in the X direction via the supporting bases 9, and the guide rods penetrate through the punching holes of the corresponding guide bases.

Figure 3:
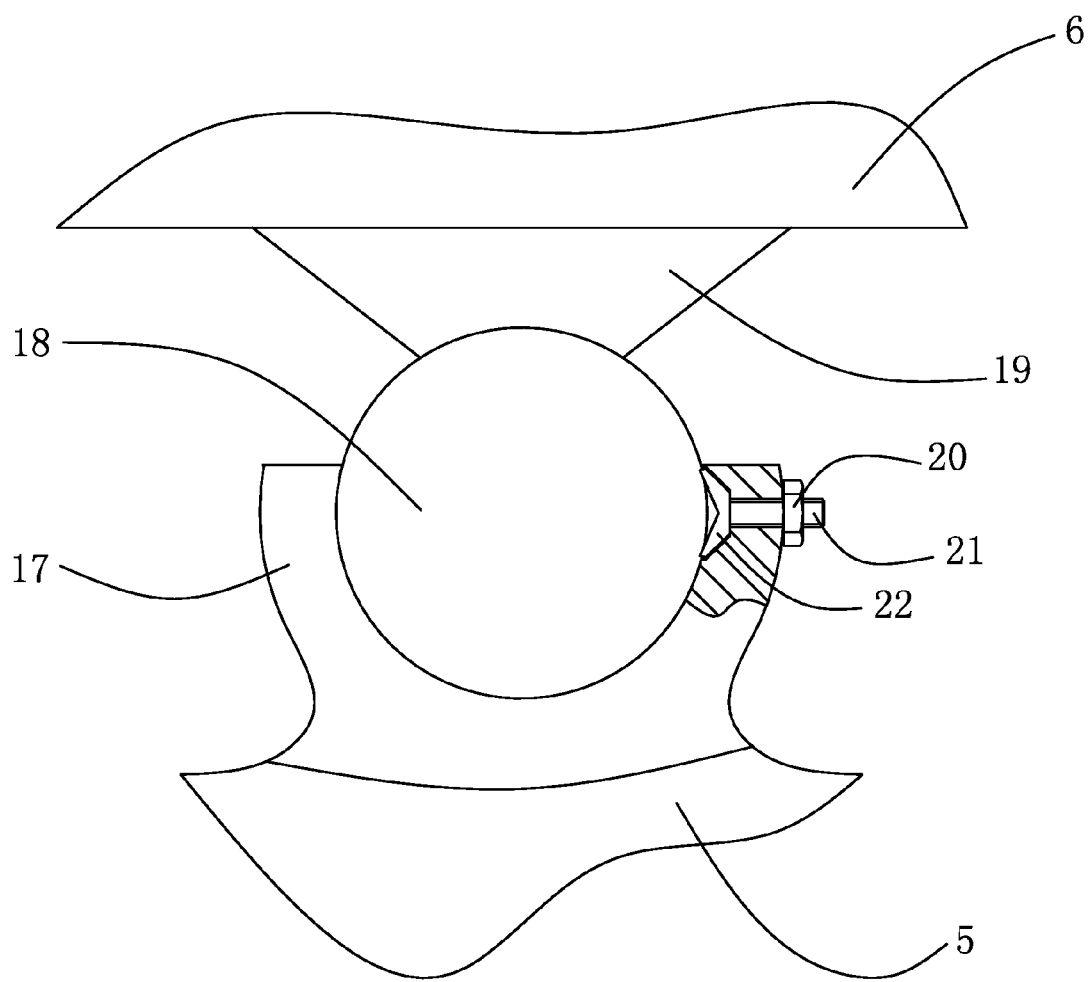
FIG. 3 is a section view of a ball seat of the invention.

The multiple angle rotation mechanism is arranged above the moving plate in the X direction and below the operating table. The multiple angle rotation mechanism comprises a universal joint device and a locking mechanism. The universal joint device comprises a ball 18 and a ball seat 17 receiving the ball. A spherical cavity fitted with the ball is arranged in the ball seat, the receiving area of the spherical cavity is 65% of the surface area of the ball, and the opening plane of the spherical cavity is horizontal, and the ball is embedded into the ball seat. The inverted round table 19 is fixed on the lower surface of the operating table, and the ball is fixed on the inverted round table. Two horizontal rod holes with internal threads (referring to FIG. 3) are arranged on the ball seat, and the rod hole penetrates through the center of the spherical cavity. A locking rod 21 is screwed in the rod hole, and external threads fitted with the internal threads of the rod hole are arranged on the periphery of the locking rod. The end part of the locking rod is rotatably connected with a clamping fork 22, the clamping fork is provided with a V-shaped bayonet, and the surface of the end part of the bayonet is an arc-shaped concave surface fitted with the ball. The inner surface of the ball seat is provided with a concave cavity fitted with the shape of the clamping fork, the concave cavity is communicated with the rod hole, the locking rod penetrates into the rod hole, the clamping fork is hidden in the concave cavity, the tail end of the locking rod extends out of the ball seat, and a locking nut 20 is screwed on the exposed end.

Two hydraulic cylinders 13 are hinged on the upper surface of the moving plate in the X direction, the upper end of the hydraulic cylinders is hinged with a fixed rod that is fixed with the lower surface of the operating table, the connection line between the hinge point of the upper end of the hydraulic cylinder and the center of the ball is parallel to the operating table, and the two hydraulic cylinders are arranged at an angle of 90 degrees with respect to the ball.

The adjusting handle is rotated to make the adjusting screw rod rotate, the adjusting screw rod drives the gear to rotate, the gear drives the leadscrew to move up and down, the leadscrew pushes the fixed plate to move up and down, so that the height of the operating table is changed. The adjusting hand wheel is rotated to adjust the moving plate in the Y direction or the moving plate in the X direction, the moving plate in the Y direction moves in the Y direction under the guide of the guide rod, the moving plate in the X direction moves in the X direction under the guide of the guide rod, thus accomplishing the movement of the operating table in the horizontal plane. The locking nut is loosened, and meanwhile, the locking rod is pulled out around the axis of the rod hole, and the clamping fork is separated from the ball. At this time, the hydraulic cylinders are adjusted via the hydraulic system, the two hydraulic cylinders drive the operating table to rotate around the center of the ball after combined, after the operating table rotates to a proper angle, the locking rod is rotated again, so that the clamping fork clamps the ball. Meanwhile, the locking nut is screwed for locking.

Embodiment 2

Figure 4:
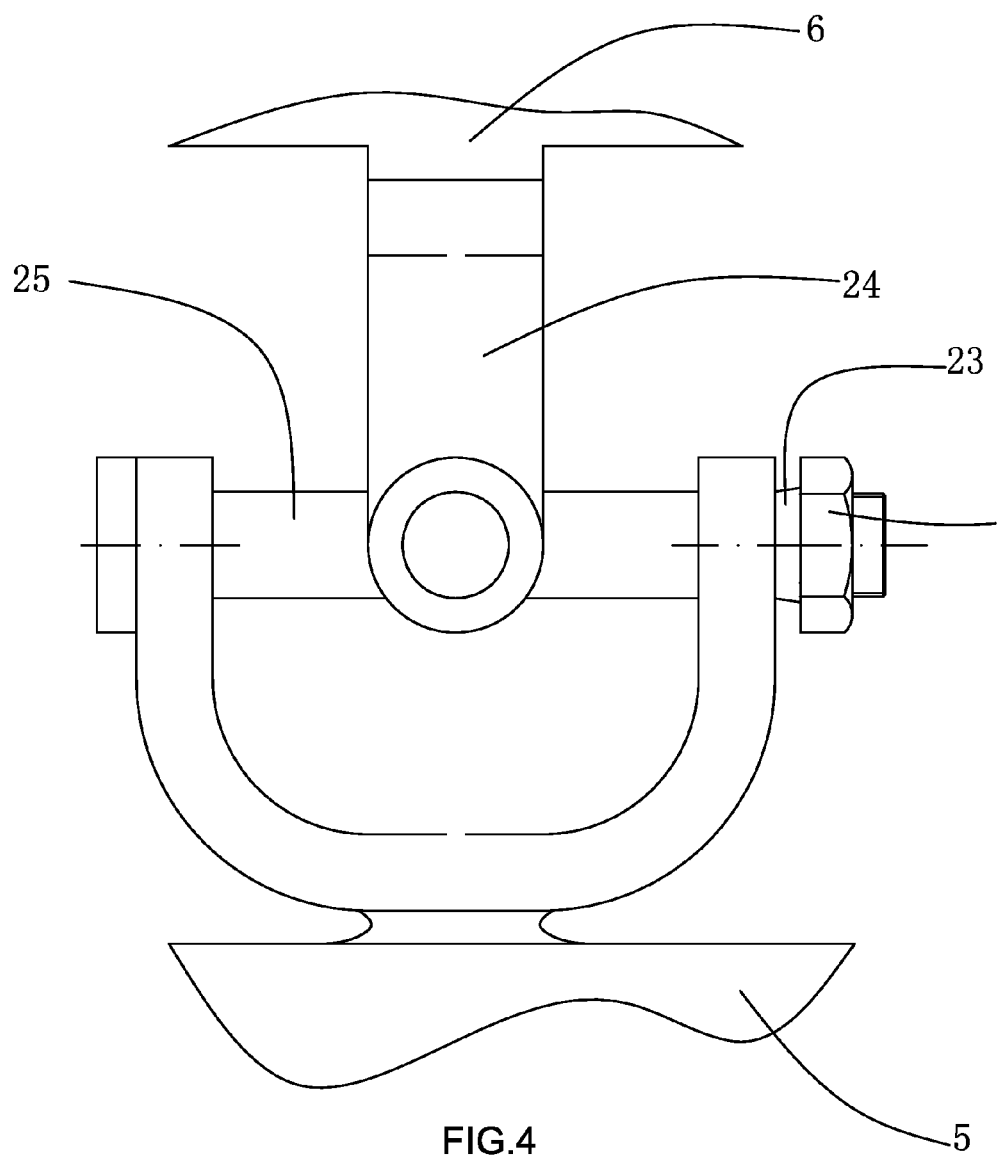
FIG. 4 is a structural diagram of another multiple angle rotation mechanism of the invention.
Figure 5:
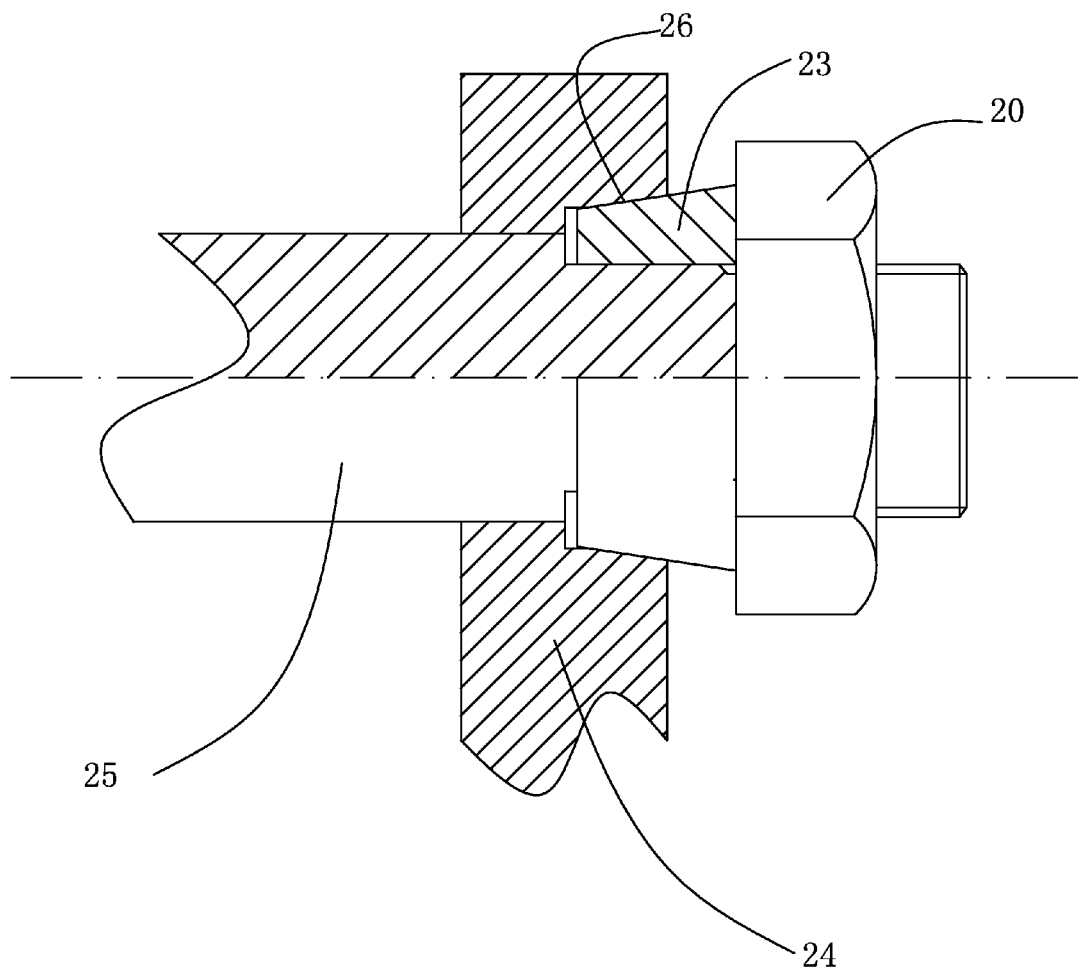
FIG. 5 is a partial section view of a universal joint of the invention.
Figure 6:
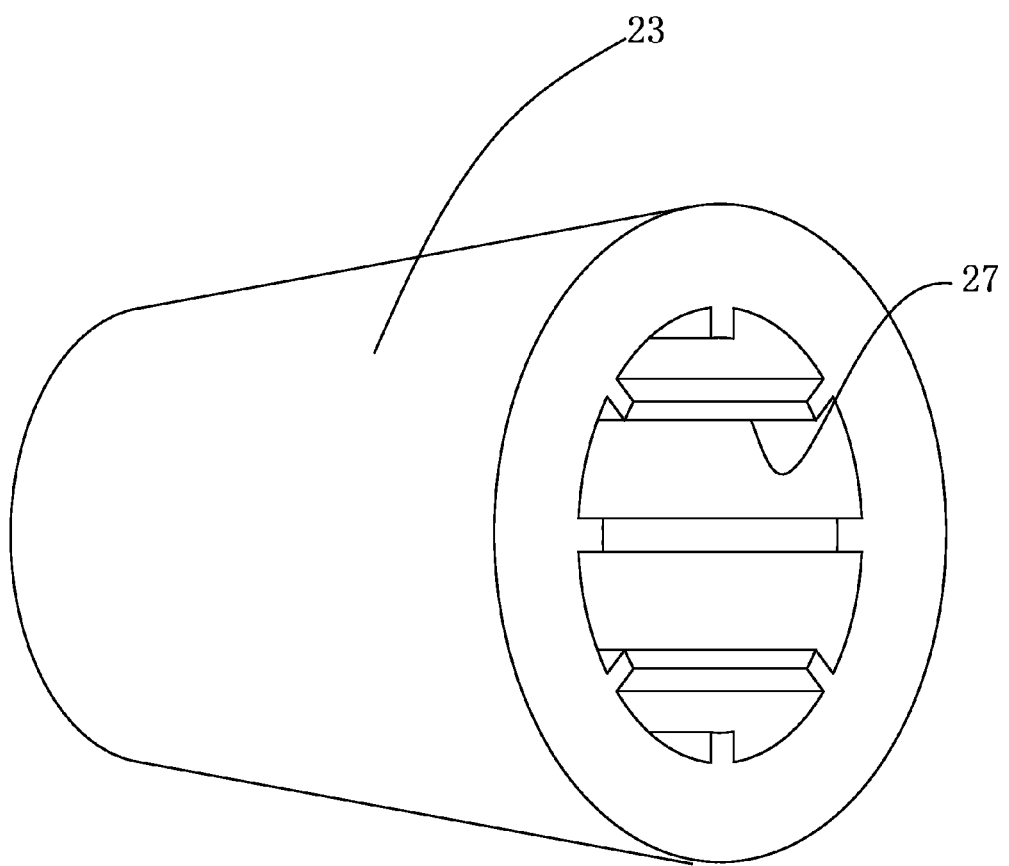
FIG. 6 is a structural diagram of a tapered locking sleeve of the invention;
In the figures: 1, pedestal; 2, supporting plate; 3, fixed plate; 4, moving plate in the Y direction; 5, moving plate in the X direction; 6, operating table; 7, universal joint device; 8, guide base; 9, supporting base; 10, adjusting wheel; 11, adjusting handle; 12, rotary sleeve; 13, hydraulic cylinder; 14, guide rod; 15, leadscrew; 16, guide post; 17, ball seat; 18, ball; 19, inverted round table; 20, locking nut; 21, locking rod; 22, clamping fork; 23, locking sleeve; 24, U-shaped fork; 25, cross shaft; 26, tapered hole; 27, convex rib.

An operating table with multiple degrees of freedom (referring to FIG. 4 and FIG. 5) is provided. The universal joint device comprises a universal joint, the universal joint comprises a cross shaft 25 in the middle and two U-shaped forks 24 which are vertically arranged. The U-shaped forks are placed oppositely, one of the U-shaped forks is fixed with the center part of the lower surface of the operating table, and the other one is fixed with the center part of the upper surface of the moving plate in the X direction. Two vertical shaft ends of the cross shaft are provided with spline grooves, each shaft end is sleeved with a tapered locking sleeve 23 (referring to FIG. 6), the inner hole of the locking sleeve is provided with a convex rib 27 which is corresponding to the spline groove, the outer surface of the locking sleeve is a tapered surface, the end part of the U-shaped fork which is corresponding to the shaft end is provided with a tapered hole 26, the outer side of the shaft end is provided with screw threads, a locking nut is screwed on the screw threads, the locking nut contacts with the locking sleeve, and the tapered surface of the locking sleeve is matched with the tapered hole. The outer diameter of the screw threads of the shaft end is smaller than the inner diameter of the spline groove. Other structures refer to the Embodiment 1.

The adjusting handle is rotated to make the adjusting screw rod rotate, the adjusting screw rod drives the gear to rotate, the gear drives the leadscrew to move up and down, the leadscrew drives the fixed plate to move up and down, so that the height of the operating table is changed. The adjusting hand wheel is rotated to adjust the moving plate in the Y direction or the moving plate in the X direction, the moving plate in the Y direction moves in the Y direction under the guide of the guide rod, the moving plate in the X direction moves in the X direction under the guide of the guide rod, thus accomplishing the movement of the operating table in the horizontal plane. The locking nut is loosened, and the friction force between the locking sleeve and the tapered hole is reduced. The hydraulic system is adjusted, the operating table rotates under the combined effect of the hydraulic cylinders, after the operating table rotates to a proper angle, the locking nut is rotated, and the locking nut pushes the locking sleeve to move around the axis of the cross shaft. Meanwhile, the locking sleeve and the tapered hole are clamped, and the locking nut is screwed for locking the operating table.

The above embodiments are only two preferred solutions of the invention and not intended to limit the invention in any form. The invention may have other variants and modifications within the technical solutions defined by the claims.

What is claimed is:

1. An operating table with multiple degrees of freedom, comprising a pedestal (1), a moving device arranged on the pedestal, and an operating table (6) connected with the moving device, wherein the moving device comprises an elevating mechanism, a moving mechanism on a horizontal plane and a multiple angle rotation mechanism; the elevating mechanism and the moving mechanism adopt a leadscrew structure; the elevating mechanism comprises a leadscrew and a rotary sleeve (12) connected with the leadscrew; the moving mechanism consists of a moving mechanism in the X direction and a moving mechanism in the Y direction; the moving mechanism in the X direction and the moving mechanism in the Y direction comprise one leadscrew and a leadscrew nut connected with this leadscrew, respectively, and, the moving mechanism in the X direction and the moving mechanism in the Y direction are mutually overlapped vertically and fixed with the top end of the leadscrew of the elevating mechanism; and the multiple angle rotation mechanism comprises a universal joint device (7) and a locking mechanism.

2. The operating table with multiple degrees of freedom according to claim 1, wherein the pedestal is of a frame structure, and has a supporting plate (2) on which the elevating mechanism is arranged; and the moving device also comprises a guide post (16) which is parallel to the leadscrew (15) of the elevating mechanism, and the guide post is inserted into a guide hole on the supporting plate.

3. The operating table with multiple degrees of freedom according to claim 1, wherein a gear is arranged inside the rotary sleeve, a threaded hole is arranged in a center part of the gear, the leadscrew of the elevating mechanism penetrates into the threaded hole to fit therewith, an adjusting screw rod with an adjusting handle (11) is arranged on a side of the rotary sleeve, the adjusting screw rod is engaged with gear teeth of the gear, and the rotary sleeve is fixed on the lower surface of the supporting plate on the pedestal.

4. The operating table with multiple degrees of freedom according to claim 1, wherein the moving mechanism in the Y direction comprises a fixed plate (3) fixed with the leadscrew of the elevating mechanism and a moving plate in the Y direction (4) connected with the fixed plate through a guide rail, the leadscrew of the moving mechanism in the Y direction is fixed on the fixed plate, and the leadscrew nut of the moving mechanism in the Y direction is fixed to the lower surface of the moving plate in the Y direction; the moving mechanism in the X direction comprises a moving plate in the X direction (5), the leadscrew of the moving mechanism in the X direction is fixed to the upper surface of the moving plate in the Y direction, and the leadscrew nut of the moving mechanism in the X direction is fixed to the lower surface of the moving plate in the X direction, the two leadscrews are mutually vertical, and the moving plate in the X direction and the moving plate in the Y direction are connected via the guide rail.

5. The operating table with multiple degrees of freedom according to claim 4, wherein the guide rail comprises a guide rod (14) and a guide base (8) fitted with the guide rod; the guide rod penetrates through the guide base, two ends of the guide rod are fixed via a supporting base (9), the supporting base is fixed at the bottom, and the guide rod is fixed on the top; and the guide rail of the moving mechanism in the X direction and the guide rail of the moving mechanism in the Y direction are parallel to the respective corresponding leadscrews.

6. The operating table with multiple degrees of freedom according to claim 1, wherein the universal joint device comprises a ball (18) and a ball seat (17) receiving the ball; a spherical cavity fitted with the ball is arranged in the ball seat, the receiving area of the spherical cavity is greater than 50% of the surface area of the ball, and the ball is embedded into the ball seat; and an inverted round table (19) is fixed on the lower surface of the operating table, and the ball is fixed on the inverted round table.

7. The operating table with multiple degrees of freedom according to claim 6, wherein the locking mechanism comprises two locking rods (21) with external threads, an end of the locking rod is connected with a V-shaped clamping fork (22), and an opposite surface of the locking fork is provided with an arc-shaped concave surface fitted with the ball; a rod hole with internal threads is arranged on the ball seat, and the tilted rod hole penetrates through the center of the spherical cavity; and the inner surface of the ball seat is provided with a concave cavity fitted with the shape of the clamping fork, the concave cavity is communicated with the rod hole, the clamping rod penetrates into the rod hole, the clamping fork is hidden in the concave cavity, and the tail end of the locking rod extends out of the ball seat and is screwed with a locking nut (20) on the exposed end.

8. The operating table with multiple degrees of freedom according to claim 1, wherein the universal joint device comprises a universal joint; the universal joint comprises a cross shaft (25) in the middle and two U-shaped forks (24) which are vertically arranged, and the U-shaped forks are oppositely placed; and one of the U-shaped forks is fixed with the center part of the operating table, while the other one is fixed with the moving mechanism in the X direction or the moving mechanism in the Y direction.

9. The operating table with multiple degrees of freedom according to claim 8, wherein the two vertical shaft ends of the cross shaft extend out of the U-shaped forks, the corresponding connection part between the U-shaped forks and the two shaft ends is a tapered hole (26), the extended shaft end is sleeved with a tapered locking sleeve (23) fitted with the tapered hole, and the tapered locking sleeve is fixed by a locking nut.

10. The operating table with multiple degrees of freedom according to claim 1, wherein the elevating mechanism, the moving mechanism and the multiple angle rotation mechanism are connected with an automatic driving device, respectively, and the automatic driving device is a servo motor or a hydraulic mechanism; the adjusting screw rod on a side of the rotary sleeve of the elevating mechanism is connected with the servo motor, and the leadscrew of the moving mechanism is connected with the servo motor; the hydraulic mechanism comprises hydraulic cylinders (13) and a hydraulic system, and there are total two hydraulic cylinders which are hinged to the lower surface of the operating table with an interval of 90 degrees with respect to the multiple angle rotation mechanism; and the connection line between an upper hinge point of the hydraulic cylinder and the rotation center of the operating table is parallel to the operating table.

* * * * *